3,634,541
SULFO-MODIFIED POLYESTERS AND SHAPED
STRUCTURES MADE THEREFROM
Jurgen Popp, Kelkheim, Taunus, Franz Jakob, Hofheim,
Taunus, and Heinzhorst Mobius, Frankfurt am Main,
Germany, assignors to Hystron Fibers Incorporated,
Spartanburg, S.C.
No Drawing. Filed Aug. 8, 1969, Ser. No. 848,683
Claims priority, application Germany, May 10, 1969,
P 19 24 050.7
Int. Cl. C08g 17/14
U.S. Cl. 260—75 S                    12 Claims

ABSTRACT OF THE DISCLOSURE

The invention provides fiber-forming, synthetic linear polyesters comprising, in addition to the usual dicarboxylic acid moiety and diol moiety, definite amounts of araliphatic sulfonate radicals of the general formula

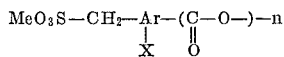

in which

Me stands for alkali metal,
Ar represents the benzene nucleus
X stands for hydrogen, methyl or the group
  $MeO_3S—CH_2—$ and
$n$ is 1 or 2.

in the polymer molecule. The polyesters and the shaped structures made therefrom have a good affinity for basic dyestuffs and the dyeings obtained are very fast to light. Moreover, the filaments and fibers obtained have a low folding endurance and are, therefore, suitable for the manufacture of fabrics having a minor tendency to pilling.

---

The present invention relates to novel modified polyesters and to filaments, fibers and films made of the said polyesters and having an improved affinity for cationic dyestuffs.

Linear polyesters made in known manner from dicarboxylic acids or the ester-forming derivatives thereof and diols, for example polyethylene terephthalate or the polyester of terephthalic acid and 1,4-dimethylolcyclohexane, only contain a small number of reactive groups and hence, they have a poor affinity especially for cationic dyestuffs. This affinity can be improved, for example, by incorporating into the polymer chain monomer units containing anionic groups such as the sulfonate or phosphonate group. Sulfonate-containing monomers and copolyesters containing the said monomers have been described in U.S. Pats. 3,018,272, 3,164,566, 3,164,567, 3,164,570, 3,166,531, 3,184,434, 3,185,671, 3,238,180 and 3,301,819. In the described polymers the sulfo or sulfonate groups are exclusively bound to an aromatic nucleus either directly or via a group containing an ether function, or they are bound to an alkylene group and separated from the ester-forming carboxyl function by at least 3 carbon atoms.

The present invention provides novel, fiber-forming synthetic linear polyesters containing in the polymer molecule chain members with sulfonate groups, which polyesters contain 0.1 to 10 mol percent, calculated on the polymer unit consisting of dicarboxylic acid moiety and diol moiety, of at least one chain member of the general formula

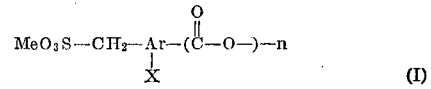

in which

Me stands for an alkali metal ion
Ar means the benzene nucleus
X is a hydrogen atom, a methyl group or the group
  $MeO_3S—CH_2—$ and
$n$ is 1 or 2.

The radical of Formula I incorporated into the polyester chain according to the invention contains an alkali metal ion as substituent Me. For preparing the sulfonic acid salts lithium, sodium, potassium, rubidium and cesium are suitable, sodium and potassium being preferred because of their better accessibility. Monomers which have a plurality of $CH_2$ groups or substituted $CH_2$ groups between the $MeO_3S$ and aryl group, which contain other aromatic radicals instead of the benzene nucleus and other radicals than $CH_3$, for example $C_2H_5$ or $C_3H_7$, are more difficult to prepare and, therefore, less suitable.

In general, the chain member of general Formula I is incorporated into the polymer chain via two

groupings. Alternatively, the chain member containing the sulfonate group or groups may have a terminal position in the polyester molecule, especially when it contains only one

grouping. The polyester chain may, of course, also contain simultaneously chain members of Formula I incorporated within the chain and bound in terminal position.

The modified polyesters according to the invention have a total content of chain members of Formula I of 0.1 to 10 mol percent calculated on the polymer unit consisting of dicarboxylic acid moiety and diol moiety. The term polymer unit designates the recurring unit of the polyester forming dicarboxylic acid moiety and the diol moiety which do not carry sulfonate group(s), which units form the preponderant portion of the polymer molecule.

The said polymer units contain as dicarboxylic acid moiety preferably the radical of terephthalic acid, isophthalic acid, naphthalene-2,6-dicarboxylic acid or of another aliphatic dicarboxylic acid such as adipic acid or sebacic acid. Other diarboxylic acids that can also be used but are less suitable are naphthalene-1,3-, 1,4-, and 1,5-dicarboxylic acids, 4,4′-diphenyl-dicarboxylic acid, 2,5-dimethylterephthalic acid, bis(p - carboxyphenoxy)-ethane, hexahydroterephthalic acid, cyclobutane-1,2-dicarboxylic acid, cyclobutane-1,3-dicarboxylic acid, suberic acid, decane-dicarboxylic acid and sulfonyl-4,4-dibenzoic acid. As diol moiety the polymer units contain the radical of an aliphatic, alicyclic or araliphatic diol having 2 to 10 carbon atoms. In the polyester of the invention the specified acids may constitute the dicarboxylic acid moiety of the polymer either alone or in admixture with one another, as well as the diol moiety may consist of one or several of the following diols mentioned by way of example: glycols such as ethylene glycol, trimethylene glycol, 1,4-butane-diol, 1,5-pentane-diol, 1,6-hexane-diol, 1,7-heptane-diol, or 1,4-dimethylolcyclohexane, as well as propane-diol - 1,2, cyclobutane-diol-1,2-cyclobutane-diol-1,3 1,3-xylylene glycol, 1,4-xylylene glycol, bis(4,4'-hydroxyphenyl)-dimethylmethane, 1,3-bis(hydroxyethoxy)-benzene and 1,4-bis(hydroxyethoxy)-benzene.

The polymer units preferably consist of at least 90 mol percent, of terephthalic acid an dethylene glycol, calculated on the content of dicarboxylic acid and diol, respectively, of the polymer unit. The difference to up to 100 mol percent is made up by the other specified dicarboxylic acids and diols. When the polymer units contain, in addition to ethylene glycol units, units of 2,2-dimethyl-1,3-propane-diol, the proportion of latter units should not exceed 5 mol percent.

More particularly, the polyesters according to the invention contain, in addition to the chain member of general Formula I, for example the following recurring units either alone or side by side in the polymer unit:

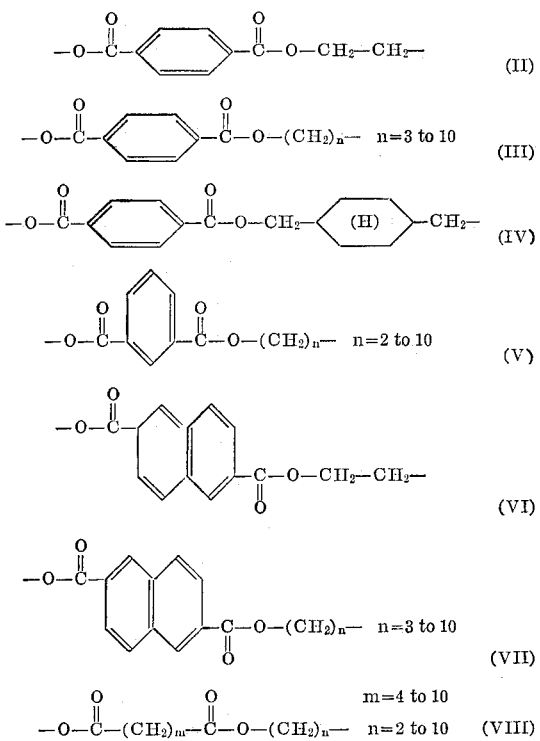

The polyesters of the invention are produced by methods known for the manufacture of polyesters by direct esterification or ester interchange reaction with subsequent polycondensation. Suitable starting materials are, besides terephthalic acid, isophthalic acid, naphthalene-2,6-dicarboxylic acid, aliphatic dicarboxylic acids such as adipic acid, or sebacic acid and the diesters of the said acids with aliphatic alcohols having 1 to 8 carbon atoms, such as methanol, ethanol, propanol, butanol, or hexanol and the preferably aliphatic or alicyclic diols used for the formation of polyesters and having 2 to 10 carbon atoms, compounds of the general formula

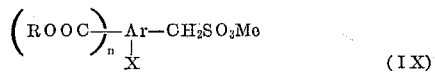

in which Me, Ar, X and $n$ have the same meanings as in Formula I and R stands for an alkyl radical having 1 to 8 carbon atoms, for example —$CH_3$, —$CH_2$—$CH_3$, —$CH_2$—$CH_2$—$CH_3$, —$CH_2CH_2CH_2$—$CH_3$,

—$CH_3CH_2CH_2CH_2$—$CH_3$

If the polyester is made by direct esterification R may also stand for hydrogen.

In the preferred manufacture of the polyesters of the invention by ester interchange reaction of the diesters of the dicarboxylic acids with the diol with subsequent polycondensation the compounds of general Formula IX are advantageously added to the reaction mixture at the beginning of the ester interchange reaction. It is likewise possible, however, to add them during a later stage of the manufacturing process prior to the end of the polycondensation. According to a preferred method the dialkyl esters of aromatic dicarboxylic acids are subjected to an ester interchange reaction with a 2 to 10-fold, preferably 2 to 3-fold molar excess of the diol, at a temperature of from 150° C. to 270° C. and the calculated amount of the compound of general Formula IX is added either prior to or during the ester interchange reaction. When the ester interchange is terminated the excess of diol is removed in an atmosphere of an inert gas at atmospheric pressure or under reduced pressure and at a temperature of up to 300° C. The product obtained is then polycondensed in an atmosphere of an inert gas under a pressure of 0.1 to 5 mm. of mercury and at a temperature of 230 to 310° C., preferably 250 to 305° C.

The ester interchange reaction and the polycondensation are accelerated by catalysts known for these reactions, for example compounds of zinc, calcium, manganese, antimony, germanium, or titanium. Stabilizers and inhibitors, for example phosphorus compounds, or delustering agents such as titanium dioxide can also be added in usual manner, as well as cross-linking agents and light stabilizers.

The monomers of general Formula IX used for making the modified polyesters of the present invention have not been described in literature. They are obtained in known manner, for example by reacting appropriate benzyl halides with sodium sulfite in a solution of acetone and water (cf. C. A. Bunton and E. A. Halevi, J. Chem. Soc. 1952, page 4541).

The sulfonates of general Formula IX which are obtained in a good yield can be recrystallized from alcoholic or aqueous-alcoholic solutions whereby analytically pure compounds are obtained.

As comonomers for the manufacture of the modified polyesters of the invention the following bifunctional sulfonates corresponding to Formula IX in which $n$ stands for 2 can be used, for example:

sodium-3,5-dicarbomethoxy-benzylsulfonate
sodium-2,4-dicarbomethoxy-benzylsulfonate
sodium-2,5-dicarbomethoxy-benzylsulfonate
disodium-2,5-dicarbomethoxy-p-xylylene-disulfonate
disodium-4,6-dicarbomethoxy-m-xylylene-disulfonate
sodium-2,5-dicarbomethoxy-4-methyl-benzylsulfonate
sodium-2,4-dicarbomethoxy-5-methyl-benzylsulfonate and preferably
sodium-3,5-dicarbomethovy-benzylsulfonate and
disodium-4,6-dicarbomethoxy-m-xylylene-disulfonate.

As typical representatives of compounds of Formula IX containing but one carboalkoxy group ($n=1$) there are mentioned sodium-4-carbomethoxy-benzylsulfonate,
sodium-3-carbomethoxy-benzylsulfonate and
disodium-5-carbomethoxy-m-xylylene-disulfonate.

The latter monomers may also be used in admixture with the sulfonates carrying two carboalkoxy groups ($n=2$), preferably in an amount of from 0.1 to 3.0 mol percent, calculated on the polymer unit consisting of dicarboxylic acid moiety and diol moiety. The incorporation of sulfonates containing one carboalkoxy group at the end of the polymer chain, whereby the chain is interrupted, allows of a regulation of the molecular weight.

In the absence of a delustering agent the modified polyesters of the invention form limpid melts of excellent brightness and minor yellow tint. By the addition of the sulfonate-groups-containing comonomers of Formula IX polyesters having very high melt viscosities are obtained with shortened polycondensation periods. The melting point depression is relatively low even with higher content of chain members of general Formula I.

To characterize the polyesters of the invention the differential thermoanalysis and the determination of the relative viscosity ($\eta_{rel}$) of a 1% by weight solution of the polyester in a 3:2 mixture of phenol and tetrachloroethane at 25° C. was used.

The modified polyesters of the invention are suitable for the manufacture of shaped structures such as filaments, fibers or films. The structures are shaped in known manner from the melt of the polyester.

The filaments or fibers obtained from the polyesters by spinning of the melt are distinguished by good mechanical properties, a bright colour and a high affinity for cationic dyestuffs. The absorption capacity of dispersion dyestuffs is also much better than that of non modified polyesters.

When the polyesters of the invention or filaments, fibers or films made therefrom are dyed with basic dyestuffs, the alkali metal cations Me of the sulfonate groups of the chain member of general Formula I are readily exchanged for the cations of the basic dyestuff which is fixed on the polymer molecule by ionic bond. Thus, the dyed modified polyesters of the invention and the filaments, fibers or films made therefrom contain in the polymer molecule a chain member of the general formula

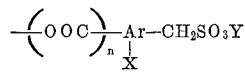

in which Y represents the cation of a known basic dyestuff, Ar stands for the benzene nucleus, X is a hydrogen atom, the methyl radical or the group $YO_3S$—$CH_2$—, and $n$ means 1 or 2.

The modified polyesters of the invention have a high melt viscosity and a lower relative viscosity than known polyesters that have not been modified. Owing to this property the polyesters of the invention can be spun from the melt without technical difficulty into fibers and filaments having a relative viscosity of less than 1.50. The fibers obtained have a low folding endurance and can, therefore, be used for the manufacture of fabrics having a low tendency to pilling. The colorations of the shaped structures of the modified polyester dyed with basic dyestuffs have a very good fastness to light.

The following examples serve to illustrate the invention but they are not intended to limit it thereto. Paragraph (A) relates to the preparation of sulfonate-groups-containing comonomers of Formula IX.

(A)

(1) In a 1 liter, three-necked flask provided with stirrer, reflux condenser and thermometer 60.5 grams of 3,5-dicarbomethoxy-benzyl chloride and 37.5 grams of sodium iodide dissolved in 500 milliliters of acetone were heated for 30 minutes with reflux. The reaction mixture was filtered while hot and the solution was refluxed for 1 hour together with 68.7 grams of sodium sulfite dissolved in 250 milliliters of water. When the reaction was terminated the undissolved matter was separated by filtration. The solution was cooled whereupon 56 grams of sodium-3,5-dicarbomethoxy-benzylsulfonate were obtained which could be recrystallized from an aqueous-alcoholic solution to yield the analytically pure compound. Yield 52 grams of analytically pure sodium-3,5-dicarbomethoxy-benzylsulfonate in the form of white crystals readily soluble in water. Further fractions could be obtained by concentration by evaporation of the filtrates.

(2) In the manner described in Example 1, 73.8 grams of 4-carbomethoxy-benzyl chloride, 37.5 grams of sodium iodide and 68.7 grams of sodium sulfite were reacted in aqueous-acetonic solution. The reaction mixture was filtered, 100 milliliters of acetone were added to the solution and the solution was cooled. 64 grams of sodium-4-carbomethoxybenzylsulfonate were obtained which could be recrystallized from methanolic-aqueous solution to yield the analytically pure compound. Yield 57 grams of analytically pure sodium-4-carbomethoxy-benzylsulfonate. The yield can be increased by concentration of the filtrates.

Instead of the iodides there may also be used the chlorides or bromides. The reaction then takes a longer period of time and the yield is a little lower.

(3) In a 1-liter, three-necked flask provided with stirrer and reflux condenser 76 grams of 4,6-dicarbomethoxy-m-xylylene dibromide dissolved in 200 milliliters of acetone and 60 grams of sodium sulfite dissolved in 75 milliliters of water were refluxed for 24 hours while stirring. Then 200 milliliters of acetone were added and the reaction mixture was cooled. 62 grams of disodium-4,6-dicarbomethoxy-m - xylylene-disulfonate were obtained which could be recrystallized from aqueous acetonic solution to yield the analytically pure compound. Yield 55 grams of analytically pure disodium-4,6-dicarbomethoxy-1,3-benzylidene-disulfonate.

(B) Manufacture of the modified polyesters and of filaments and fibers therefrom The test colorations described in the following examples were carried out with a fiber-to-liquor ratio of 1:50 at 98 to 100° C. within the course of 90 minutes. The dyestuffs were used in an amount of 2% by weight, calculated on the fibers and filaments.

The following dyestuffs were used:

(1) Astrazon Red 6 B, Colour Index, second edition, 1956, volume I, Basic Violet 7, page 1635, No. 48020,
(2) Astrazon Red RL, C.I., second edition, 1956, supplement, 1963, Basic Red 25, page 162.
(3) Deorlene Brillant Yellow 5 GL, C.I., second edition, 1956, supplement, 1963, page 149, Basic Yellow 13,
(4) Basacryl Blue GL, C.I., second edition, 1956, supplement, 1963, Basic Blue 54, page 175,
(5) Maxilon Blue RL, C.I., second edition, 1956, supplement, 1963, Basic Blue 40, page 172.

EXAMPLE 1

In a vessel provided with stirrer, column and condenser 1,000 grams of dimethyl terephthalate, 812 grams of ethylene glycol, 33 grams of sodium-3,5-dicarbomethoxy-benzylsulfonate, 0.083 gram of zinc acetate, 0.033 gram of calcium acetate and 0.306 gram of $Sb_2O_3$ were heated for 3 hours at 175° C. to 230° C. until the evolution of methanol ceased.

To eliminate the excess glycol the product obtained was heated in a polycondensation vessel for 30 minutes at 250° C. Next, the pressure was reduced within 60 minutes to 0.2 to 0.5 mm. of mercury, the temperature remaining the same. The polycondensation taking place with separation of ethylene glycol was terminated by heating at 275° C. under a pressure of 0.2 to 0.5 mm. of mercury. The time required at a temperature of 275° C. and under a pressure of 0.2 to 0.5 mm. of mercury to reach the final viscosity is defined as time of polycondensation.

In the present example after 60 minutes a colorless condensation product was obtained having a relative viscosity of 1.56, a second order transition temperature of 74.5° C., a crystallization temperature of 129.5° C. and a melting point of 251° C. The transition temperatures were determined with the aid of the DTA method.

The polyester obtained was dried for 2 hours, at 150° C. under a pressure of 10 mm. of mercury and then spun in an extruder at a temperature of 305° C. through a spinneret having 24 orifices with a draw-off rate of 1000 m./min. The filaments were drawn in usual manner in a ratio of 1:3.65 and set at 110° C. They had the following properties:

total titer—58.2 dtex
tensile strength—3.2 p./dtex
elongation—24.6%

2.5 grams of the polyester filaments were then dyed deep tints. The dyed filaments were washed at 50° C. for 30 minutes with a solution of 5 grams of Marseilles soap, i.e. a hard soap made from olive oil, and 2 grams of soda in 1 liter of water. The dyeings were very fast to washing and had a good fastness to light.

EXAMPLE 2

500 grams of dimethyl terephthalate, 406 grams of ethylene glycol, 13.8 grams of sodium-4-carbomethoxy-benzylsulfonate, 0.041 gram of zinc acetate, 0.016 gram of calcium acetate and 0.153 gram of antimony oxide were subjected to an ester interchange reaction for 1.5 hours at a temperature of 180° C. to 215° C. and then polycondensed.

The white crystalline polyester obtained after a polycondensation time of 90 minutes had a relative viscosity of 1.59, a second order transition temperature of 73° C., a crystallization temperature of 108° C. and a melting point of 250° C. The polyester had good spinning and drawing properties. The filaments made from the polyester were dyed medium tints by the dyestuff specified above.

EXAMPLE 3

500 grams of dimethyl terephthalate, 406 grams of ethylene glycol, 18.3 grams of sodium-4-carbomethoxy-benzylsulfonate, 24.2 grams of sodium-3,5-dicarbomethoxy-benzylsulfonate, 0.041 gram of zinc acetate, 0.016 gram of calcium acetate and 0.153 gram of antimony trioxide were subjected to an ester interchange reaction as described in Example 1 for 2 hours at 180° C. to 235° C. After a time of polycondensation of 70 minutes a white crystalline polyester was obtained having a relative viscosity of 1.49, a second order transition temperature of 75° C., a crystallization temperature of 115° C. and a melting point of 251° C.

The filaments made from the polyester by melt spinning were dyed very deep tints by the dyestuffs specified above. When made into a fabric the filaments had a low tendency to pilling only.

EXAMPLE 4

950 grams of dimethyl terephthalate, 50 grams of dimethyl isophthalate, 812 grams of ethylene glycol, 33 grams of sodium-3,5-dicarbomethoxy-benzylsulfonate, 0.083 gram of zinc acetate, 0.033 gram of calcium acetate and 0.306 gram of antimony trioxide were subjected to an ester interchange reaction for 2.5 hours at 180° C. to 225° C.

After a polycondensation time of 50 minutes a colorless polycondensation product was obtained having a relative viscosity of 1.62, a second order transition temperature of 73° C., a crystallization temperature of 130° C. and a melting point of 239° C.

Filaments made from the polyester obtained could be dyed deep tints with the dyestuffs specified above.

EXAMPLE 5

500 grams of dimethyl terephthalate, 760 grams of 1,4-cyclohexane-dimethanol, 16.5 grams of sodium-3,5-dicarbomethoxy-benzylsulfonate and 3 milliliters of a 15% solution of $KHTi(OC_4H_9)_6$ in butanol were subjected to an ester interchange reaction for 45 minutes at a temperature of 200° C. to 240° C. until the separation of methanol was terminated.

To eliminate the excess of glycol the reaction mixture was heated for 60 minutes in a polycondensation vessel in a nitrogen current under a pressure of 1 mm. of mercury, while the temperature was slowly raised from 270 to 305° C. After having kept the mixture for another 25 minutes under a pressure of 1 mm. of mercury at 305° C. a light crystalline polyester was obtained having a relative viscosity of 1.53, a crystallization temperature of 117° C. and a melting point of 275° C.

The product had good spinning and drawing properties.

The filaments spun therefrom could be dyed medium tints with the dyestuffs specified above.

EXAMPLE 6

500 grams of dimethyl terephthalate, 36 grams of adipic acid dimethyl ester, 400 grams of ethylene glycol, 11 grams of disodium-4,6-dicarbomethoxy-m-xylylene-disulfonate, 0.041 gram of zinc acetate, 0.016 grams of calcium acetate and 0.153 gram of antimony trioxide were subjected to an ester interchange reaction for 2 hours at 180° C. to 220° C. After a time of polycondensation of 65 minutes a white crystalline polyester was obtained having a relative viscosity of 1.54, a second order transition temperature of 66° C., a crystallization temperature of 112° C. and a melting point of 241° C.

The filaments spun from the polyester could be dyed deep tints with the dyestuffs specified above.

What is claimed is:

1. A fiber-forming, synthetic, linear polyester of recurring units of an acid moiety selected from a group consisting of terephthalic acid, isophthalic acid, naphthalene-2,6-dicarboxylic acid, adipic acid, sebacic acid, naphthalene-1,3-, 1,4-, and 1,5-dicarboxylic acids, 4,4'-diphenyl-dicarboxylic acid, 2,5-dimethylterephthalic acid, bis(p-carboxyphenoxy) - ethane, hexahydroterephthalic acid, cyclobutane-1,2-dicarboxylic acid, suberic acid, decane-dicarboxylic acid and sulfonyl-4,4-dibenzoic acid and a diol moiety selected from a group consisting of ethylene glycol, trimethylene glycol, propane-diol-1,2, 2,2-dimethyl-1,3-propane-diol, 1,4-butane-diol, 1,5-pentane-diol, 1,6-hexane-diol, 1,7-heptane-diol, 1,4-dimethylolcyclohexane, cyclobutane-diol-1,2, cyclobutane-diol-1,3, 1,3-xylylene glycol, 1,4-xylylene glycol, bis(4,4'-hydroxyphenyl) - dimethylmethane, 1,3-bis(hydroxyethoxy)-benzene, and 1,4-bis(hydroxyethoxy)-benzene, and incorporated in said ester 0.1 to 10 mole percent, calculated on the recuring polymer units based on said dicarboxylic acid moiety and said diol moiety of at least a chain member of the formula

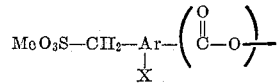

in which

Me represents an alkali metal selected from the group consisting of Li, Na, K, Rb, and Cs Ar stands for the benzene nucleus X is a member selected from the group consisting of hydrogen, methyl and the group $MeO_3S—CH_2—$ and $n$ is 1 or 2.

2. A polyester as claimed in claim 1 wherein the dicarboxylic acid moiety is selected from the group consisting of terephthalic acid, isophthalic acid, naphthalene-2,6-dicarboxylic acid, adipic acid and mixtures thereof and the diol moiety is at least one aliphatic or alicyclic diol having 2 to 10 carbon atoms selected from the group consisting of ethylene glycol, trimethylene glycol, 1,4-butane-diol, 2,2-dimethyl-1,3-propane diol, propane-diol-1,2, 1,5-pentane-diol, 1,6-hexane-diol, 1,7-heptane-diol, 1,4 - dimethylolcyclohexane, cyclobutane - diol - 1,2, and cyclobutane-diol-1,3.

3. A polyester as claimed in claim 1, having recurring polymer molecule units of the following formula

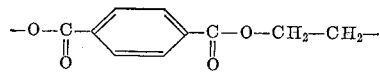

4. A polyester as claimed in claim 1, having recurring polymer molecule units of the following formula

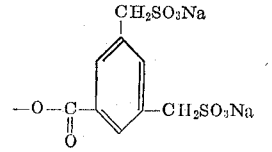

5. A polyester as claimed in claim 1, having recurring polymer molecule units of the following formula

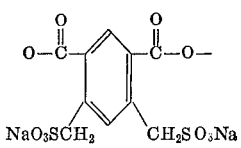

6. A filament of a polyester claimed in claim 1.
7. A fiber-forming, synthetic, linear polyester of recurring units of an acid moiety selected from a group consisting of terephthalic acid, isophthalic acid, naphthalene-2,6-dicarboxylic acid, adipic acid, sebacic acid, naphthalene-1,3-, 1,4-, 1,5-dicarboxylic acids, 4,4'-diphenyl-dicarboxylic acid, 2,5-dimethylterephthalic acid, bis(p-carboxyphenoxy)-ethane, hexahydroterephthalic acid, cyclobutane-1,2-dicarboxylic acid, suberic acid, decane-dicarboxylic acid and sulfonyl-4,4-dibenzoic acid and a diol moiety selected from a group consisting of ethylene glycol, trimethylene glycol, propane-diol-1,2, 2,2-dimethyl-1,3-propane-diol, 1,4-butanediol, 1,5-pentane-diol, 1,6-hexane-diol, 1,7-heptane-diol, 1,4-dimethylolcyclohexane, cyclobutane-diol-1,2, cyclobutane-diol-1,3, 1,3-xylylene glycol, 1,4-xylylene glycol, bis(4,4'-hydroxyphenyl)-dimethylmethane, 1,3 - bis(hydroxyethoxy)-benzene, and 1,4 - bis(hydroxyethoxy) - benzene, and incorporated in said ester 0.1 to 10 mole percent, calculated on the recurring polymer units based on said dicarboxylic acid moiety and said diol moiety of at least a chain member of the formula

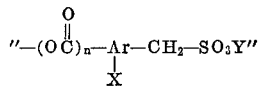

in which

Y stand for the cation of a cationic dye,
Ar is the benzene nucleus,
X is a member selected from the group consisting of hydrogen, methyl and the group —CH$_2$SO$_3$Y and $n$ means 1 or 2.

8. A fiber of a polyester defined in claim 1.
9. A film of a polyester defined in claim 1.
10. A filament of a polyester defined in claim 7.
11. A fiber of a polyester defined in claim 7.
12. A film of a polyester defined in claim 7.

References Cited
UNITED STATES PATENTS

| | | | |
|---|---|---|---|
| 3,018,272 | 1/1962 | Griffing | 260—75 |
| 3,033,824 | 5/1962 | Huffman | 260—75 |
| 3,238,180 | 3/1966 | Wiloth | 260—47 |

WILLIAM H. SHORT, Primary Examiner

L. L. LEE, Assistant Examiner

U.S. Cl. X.R.

8—55; 260—33.4 P, 33.8 R, 47 C, 470